Feb. 1, 1927.
F. J. WALLING
1,616,341
AGRICULTURAL IMPLEMENT
Filed Feb. 21, 1924
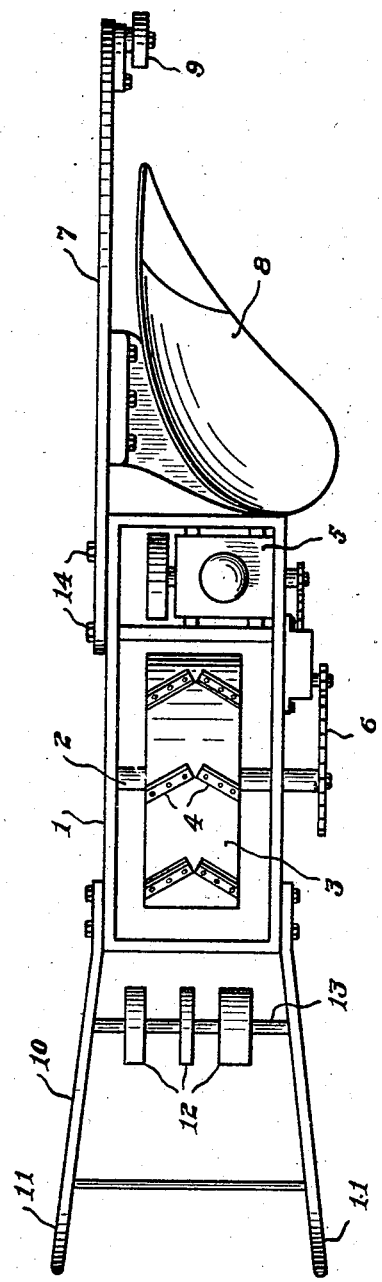
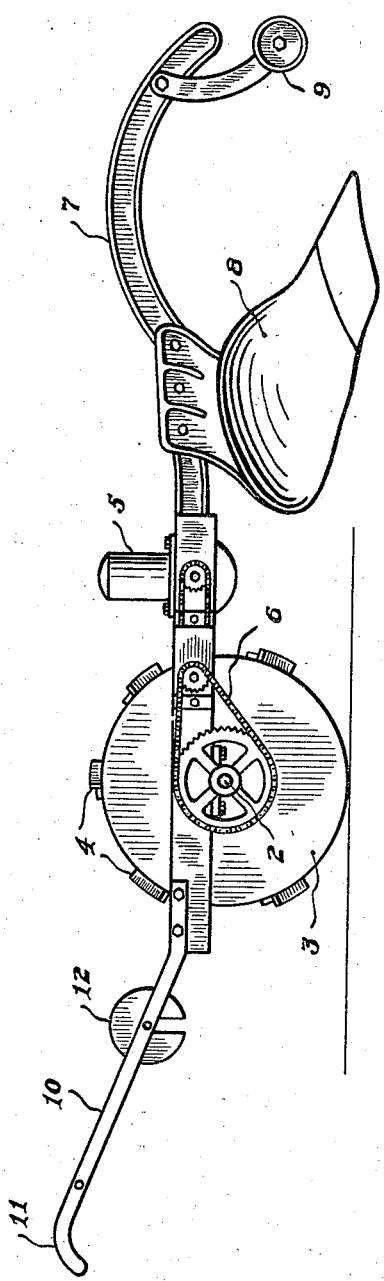
Frederick J. Walling
INVENTOR Patented Feb. 1, 1927.

1,616,341

UNITED STATES PATENT OFFICE.

FREDERICK J. WALLING, OF CAPE MAY, NEW JERSEY.

AGRICULTURAL IMPLEMENT.

Application filed February 21, 1924. Serial No. 694,408.

This invention relates to agricultural implements, and an object of the invention is to provide an implement designed to materially facilitate the manual manipulation of the various tools, such as breaking plows, cultivating plows, seeders or the like, through the provision of a novel arrangement of the supporting traction wheel, which is supported intermediate the handles of the frame structure and the tool being used.

With the positioning of the single supporting and traction wheel rearwardly of the tool, the draft on the implement will be materially decreased and the wheel will at all times follow in the furrows which is a particular advantage in breaking land in that it will prevent lateral oscillation of the implement and permit it to be steered and operated with a minimum amount of power and effort.

A further object of the invention is to provide an agricultural implement as specified, which is comparatively simple in construction, and which, owing to the features of construction, as above set forth, and permit easy regulation of the depth of insertion of the working tools into the ground as the traction wheel will serve as a fulcrum intermediate the manually operated handles and the tool, and also to provide counterweights which may be detachably associated with the tool adjacent the manually operated handles to materially facilitate the ease of operation of the implement, and also to permit the provision of an implement which is as light as possible while performing certain types of work and which will permit the placing of counter-weights at desired positions on the frame for the purpose of increasing the weight of the implement for performing various other operations, such as land breaking.

Other objects of the invention will appear in the following detail description, and in the accompanying drawings wherein:

Figure 1—is a top plan of the improved implement.

Figure 2—is a side elevation of the implement.

Referring more particularly to the drawings, the improved implement comprises a main supporting frame 1 which as shown in the drawings, is substantially rectangular in shape, and has a main suporting axle 2 carried thereby upon which a single centrally located combined supporting and traction wheel 3 is mounted. If it is so desired, the traction wheel 3 may have grouters 4 on its perimeter for increasing the traction qualities thereof. However, as grouters are well-known for this purpose, it is to be understood, that they may be used or eliminated as desired.

A prime mover 5 preferably in the form of a low horse-power internal combustion engine, is supported by the frame 1 preferably in front of the traction wheel 3, and it is connected to the wheel 3 by any suitable type of power transmitting mechanism which, in the drawings, is shown as a sprocket and chain connection 6. However, the present invention does not embrace the specific limitations to any particular type of power transmitting mechanism. The prime mover 5 through its connection with the wheel 3 will drive the wheel for propelling the implement.

A tool carrying beam 7 is attached in any suitable manner to the frame 1 at one side of the frame, and it extends forwardly from the frame so that the tool as shown at 8, will be supported in front of and in alignment with the wheel 3. In the drawings, a land breaking plow of approved construction is illustrated, and it will be noted that the relationship of the plow to the wheel is such that the wheel will follow in the furrow formed by the plow permitting smooth even running of the implement and reducing the work of guiding of the implement to a minimum. A coulter 9 of any approved construction is supported at the forward end of the beam, and it is to be understood that this may be either a rolling or stationary coulter of the cutting or packing type.

The frame 1 has handles 10 attached thereto and extending rearwardly therefrom, which handles have the usual type of hand grips 11 on their rear free ends to permit manual guiding and manipulation of the implement. The handles 10 are braced with the usual type of cross braces, and a plurality of counter-weights 12 are shown as mounted on a suitable cross bracing bar 13. The counter-weights 12 are of such construction that they may be quickly attached to or detached from the implement and they are provided to permit counter-balancing of the implement and for increasing the weight of the implement when various types of tools, such as a breaking plow, is used. However, when implements of lighter weight are employed, such as cultivating shovels, the counter-weight may be removed for providing an implement of as light a weight as possible. The beam 7 is preferably detachably connected, such as by bolts 14, to the frame 1 so that if it is desired, this beam may be disconnected and other beams substituted therefor, the said beams being of such particular construction, as to accommodate the various type of tools to be used in connection with the main frame and handle structure.

While in the foregoing description and in the accompanying drawings, a rectangular main frame 1 is shown having the handles 10 attached thereto and supporting the prime mover, it is to be understood, that the present invention embraces the use of a manually propelled implement embodying the paramount distinctive features of the device, as shown; that is the positioning of a combined supporting and traction wheel intermediate the handles and the tool used in connection with the implement, which permits of free and easy regulation of the operative depth of the tool, as well as permitting easy lateral adjustment of the tool, particularly in case of cultivation, thereby eliminating liability of crushing plants in rows, by permitting the swinging of the tool carried by the implement laterally on the supporting and traction wheel as a pivot to permit extreme accuracy in the cultivation of a row of growing plants. It is frequently the case that in the rows of growing plants, irregularities are provided, caused by slight lateral displacement of the drills, which makes it rather difficult to properly cultivate the plants with implements of approved types now in use, owing to the difficulty in lateral adjustment of such implements; the present invention however, will overcome such difficulty owing to the ease with which the tool or tools may be laterally adjusted.

It is, of course, to be understood, that the invention may be constructed in various other manners and the parts associated in different relations, and therefore, I do not desire to be limited in any manner, except as set forth in the claim hereunto appended.

What I claim is:

In a hand-guided tractor, the combination of a rectangular frame, handles secured to and extending rearwardly from said frame, a transversely extended counterweight carrying bar connected to said handles adjacent the secured ends thereof, an implement carrying beam detachably secured to one side of said frame and projecting forwardly therefrom, means carried by the free end of said beam for limiting the downward movement therof, an axle journaled to said frame intermediate its ends, a combined tractor and supporting wheel carried by said axle centrally within said frame, a prime mover positioned in said frame forwardly of said wheel, a relatively large sprocket carried by said axle on the outwardly extended end thereof, a reducing sprocket housing secured to said frame intermediate said axle and prime mover, a relatively small sprocket carried by said prime mover, and chain means for connecting said prime mover to said axle through said sprocket housing.

In testimony whereof I affix my signature.

FREDERICK J. WALLING.